United States Patent [19]

Martinez et al.

[11] Patent Number: 5,649,841
[45] Date of Patent: Jul. 22, 1997

[54] VEHICULAR ELECTRICAL ACCESS BOX

[75] Inventors: Ivan V. Martinez, Livonia; Charles P. Depp, Milan; Michael L. Trafton, Dearborn, all of Mich.

[73] Assignee: Alcoa Fujikura Ltd., Brentwood, Tenn.

[21] Appl. No.: 586,035

[22] Filed: Jan. 16, 1996

[51] Int. Cl.⁶ .................................................. H01R 9/22
[52] U.S. Cl. ...................... 439/712; 439/34; 439/724
[58] Field of Search ............................ 439/712, 713, 439/718, 723, 724, 34

[56] References Cited

U.S. PATENT DOCUMENTS

| | | | |
|---|---|---|---|
| 1,862,811 | 6/1932 | Strong | 439/718 |
| 2,459,004 | 1/1949 | Rogoff | 174/71 |
| 3,180,921 | 4/1965 | Just et al. | 174/60 |
| 3,784,728 | 1/1974 | DeBortoli et al. | 174/60 |
| 3,904,936 | 9/1975 | Hamrick, Jr. et al. | 317/118 |
| 4,050,770 | 9/1977 | Rigo | 439/724 |
| 4,605,275 | 8/1986 | Pavel | 339/119 R |
| 5,497,036 | 3/1996 | Zemlicka | 439/34 |

*Primary Examiner*—David L. Pirlot
*Assistant Examiner*—Tho Dac Ta
*Attorney, Agent, or Firm*—Gifford, Krass, Groh, Sprinkle, Patmore, Anderson & Citkowski, P.C.

[57] ABSTRACT

An access box for providing controlled electrical communication with a wiring harness has a first compartment accessible to a consumer, and a second compartment generally inaccessible to the comsumer. A series of power feed studs pass between the two compartments. Electrical contact between the wiring harness and the studs is made in the second compartment, and a consumer can electrically tap into the wiring harness via the exposed studs in the first compartment.

14 Claims, 3 Drawing Sheets

VEHICULAR ELECTRICAL ACCESS BOX

FIELD OF THE INVENTION

This invention relates generally to hardware for establishing electrical connections. More specifically, the invention relates to an access box for establishing electrical communication with selected members of a bundle of wires. Most specifically, the invention relates to an access box for use in a motor vehicle for providing controlled electrical communication with portions of a wiring harness.

BACKGROUND OF THE INVENTION

The use of electrical components in motor vehicles is increasing steadily. As a consequence, a typical motor vehicle includes one or more wiring harnesses, each comprising a multiple branched bundle of current carrying wires routed so as to deliver power to the various components, systems and electrical appliances of the motor vehicle. Often, additional electrically powered components are added to a vehicle after its manufacture, either by a dealer or by a customer. Such components may include sound systems, auxiliary lighting, radio telephones, and in some instances microwave ovens, refrigerators and like appliances.

Installation of such add on electrical components generally requires tapping into the wiring harness of the vehicle. Establishing a connection in this manner can damage the wiring harness, either by breaking of the various current carrying wires, or by breaching the integrity of the harness so as to permit entry of moisture, dirt, oil and grease thereinto. In other instances, connection is inadvertently made to the wrong conductor in the wiring harness. Finally, it is usually difficult to establish a good electrical connection to a discrete conductor in a wiring harness, since that conductor must be isolated, have its insulation stripped therefrom, have the connection established, and have the insulation reestablished; conversely, if a component is removed from the vehicle, termination of the connection can be a problem since a free wire will then be left, which can cause shorting. As will be described in greater detail hereinbelow, the present invention provides a customer access box which may be disposed in a motor vehicle and which isolates the wiring harness from a consumer, but provides a series of tap points at which a reversible electrical connection may easily be made to appropriate portions of the wiring harness.

Multiple pin terminal boards have been used in the telecommunication arts for providing contact to telephone cables; and terminal boards of this type are shown, for example, in U.S. Pat. Nos. 3,904,936; 3,784,728 and 2,953,625. However, nowhere in the prior art is there shown any type of access box of the type which will be described hereinbelow; furthermore, there is no showing or suggestion of the use of any such box in a vehicular setting.

BRIEF DESCRIPTION OF THE INVENTION

There is disclosed herein an access box for providing controlled electrical communication with a wiring harness. The box includes a first and a second compartment defined therein. Each of the compartments is enclosed by a corresponding lid which is removably attachable to the box. A wall separates the first and second compartments, and a plurality of electrically conductive power feed studs pass through the wall. Each stud has a first end disposed in the first compartment and a second end exposed in the second compartment. The box of the present invention includes mounting means for affixing it to a substrate such as a motor vehicle. The mounting means and the second lid of the box are disposed so that the second lid cannot be removed when the box is mounted to the vehicle. In this manner, the interior of the second compartment is inaccessible when the box is mounted.

In particular embodiments, the box further includes a wire feed port which communicates with the first compartment for permitting passage of wires from the first compartment to the exterior of the box, and may also include a harness feed port which is in communication with the second compartment for permitting passage of a wiring harness therethrough. The two ports may include elastomeric seals, and may further include access doors which cover the ports when they are not in use. The lids may be retained upon the box by clips, screws or the like. In certain embodiments, the power feed studs will include fasteners such as nuts or the like for reversibly engaging the wiring harness or power feed lines of the electrical components.

The present invention is also directed to a method for providing electrical access to a wiring harness of a motor vehicle. The method includes the steps of providing an access box which includes a first compartment and a second compartment defined therein. The compartments are separated by a wall having a plurality of electrically conductive power feed studs passing therethrough, each having a first end in the first Compartment and a second end in the second compartment. According to the method a portion of the wiring harness is disposed in the second compartment, and selected electrical conductors from the wiring harness are connected to the second ends of selected ones of the power feed studs. In this manner, electrical access may be had to the wiring harness, from the first compartment via the first ends of appropriate power feed studs.

DETAILED DESCRIPTION OF THE INVENTION

Figure 1:
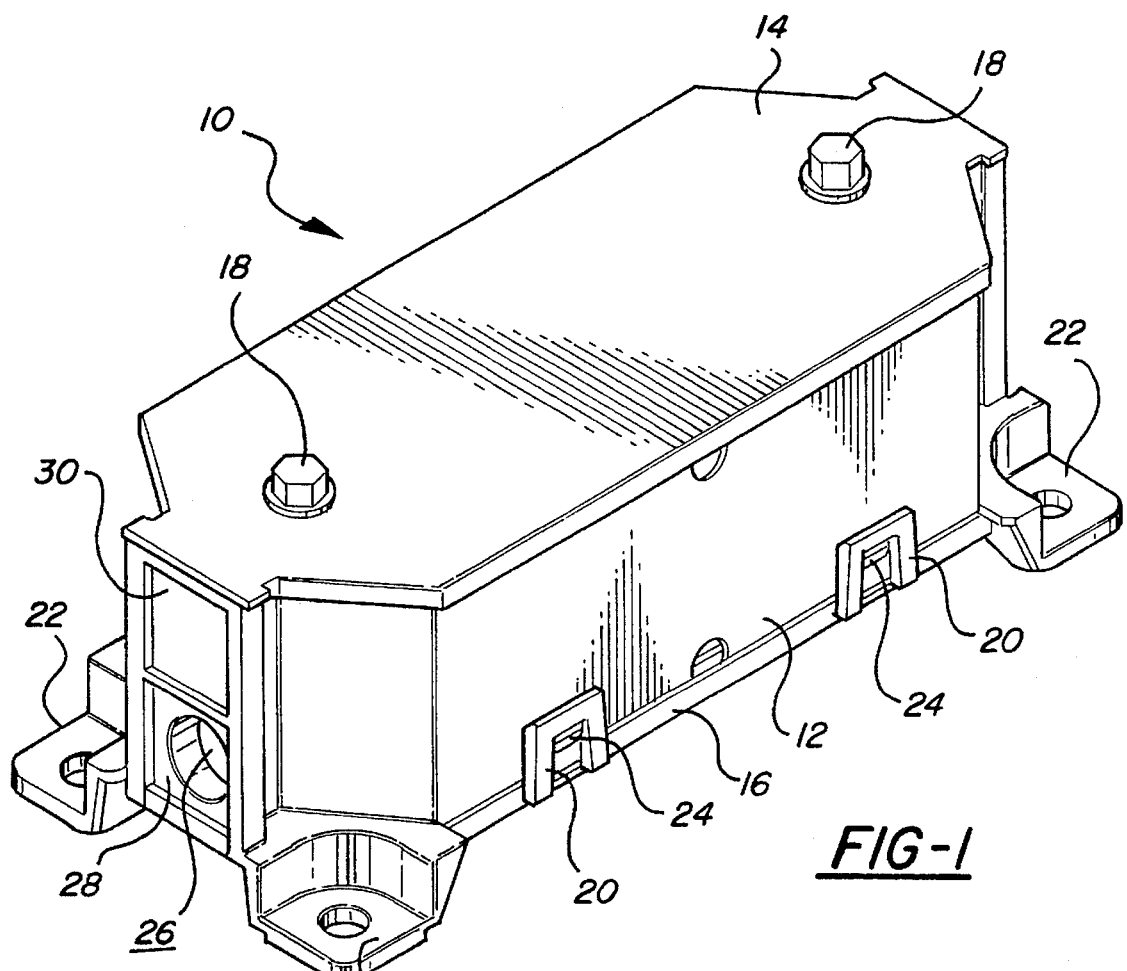
FIG. 1 is a perspective view of one embodiment of an access box structured in accord with the principles of the present invention.
Figure 3:
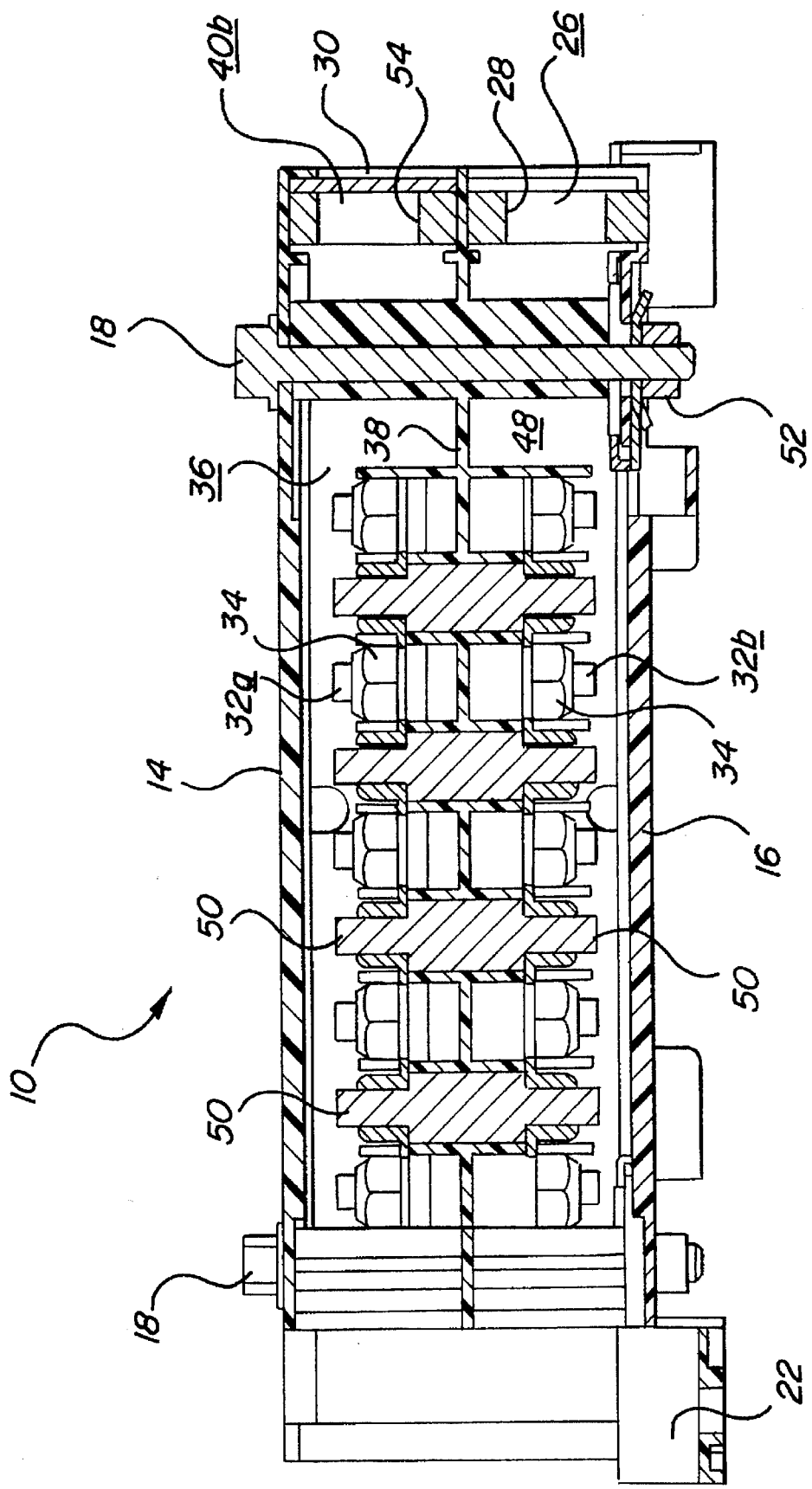
FIG. 3 is a cross sectional view of the box of FIG. 2 taken along line 3—3, and further including the first lid affixed thereto.

The present invention is directed to an access box which may be mounted into a motor vehicle and which permits an owner of the motor vehicle to tap into the electrical system of the vehicle, without the need to disrupt the vehicle's wiring harness. Referring now to FIG. 1, there is shown a perspective view of one embodiment of access box 10 structured in accord with the principles of the present invention. The box 10 of FIG. 1 includes a body portion 12 comprising side walls which are closed by a first lid 14 and a second lid 16. In the illustrated embodiment, the first lid 14 (and the second lid 16, as is best shown in FIG. 3) is attached to the body 12 by a pair of bolts 18. As is further shown in FIG. 1, the second lid 16 is also attached to the body of the box 12 by means of clips 20 which engage corresponding projections 24 on the body 12. The box 10 further includes a set of legs 22 for mounting the box onto a vehicle; as illustrated, each leg 22 includes a mounting hole defined therethrough. Visible at one end of the box 10 is a wiring harness feed port 26 defined therethrough. This feed port 26 permits passage of a wiring harness into the interior of the box 12. The port 26 is provided with an elastomeric seal 28 which serves to exclude moisture from the interior of the box 10. The box 10 may further include a wire feed port, (not shown in FIG. 1) which in this instance is shown as being covered by an access door 30. A similar access door may be used to cover the harness feed port.

Figure 2:
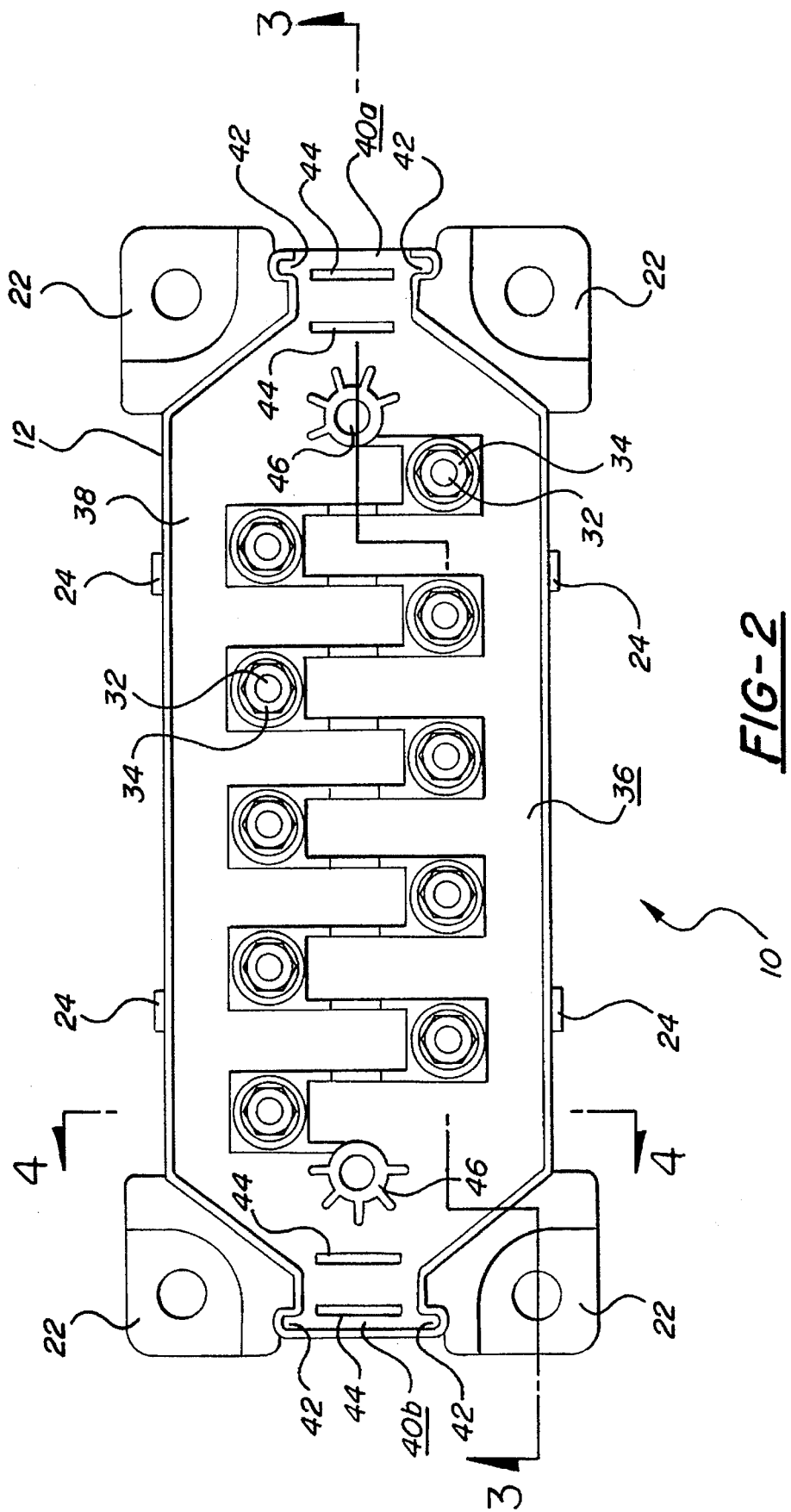
FIG. 2 is a top plan view of the box of FIG. 1 with the first lid thereof removed.

Referring now to FIG. 2, there is shown a top plan view of the box 10 of FIG. 1, as it would appear with the first and second lids removed therefrom. Visible within the box are the first ends of a series of ten power feed studs 32, each including a threaded nut 34 on a first end thereof. The nuts 34 and first ends of the studs 32 are disposed within a first compartment 36 of the box 10 as is defined by the sidewalls 12 comprising the body of the box and an interior wall 38. When the first lid of the access box 10 is removed, the first ends of the studs 32 and nuts 34 will be generally visible as is shown in FIG. 2. As will explained in greater detail hereinbelow, second ends of these studs 32 are each connected to a portion of the wiring harness, as will be further explained hereinbelow.

Also visible in FIG. 2 are two wire feed ports 40a, 40b defined through the box 10. These ports 40a, 40b permit passage of a wire from the interior of the first compartment 36 to the exterior of the box 10. As noted with regard to FIG. 1, the wire feed ports may be closed by an access door when not in use, and in the illustrated embodiment, the box 10 includes channels 42 defined therein for guiding and supporting an access door. In the illustrated embodiment, the box 10 also includes a pair of molded in supports 44 which function to retain an elastomeric seal in the region of each of the wire feed ports 40a, 40b. As noted with regard to FIG. 1, a pair of bolts may be employed to retain the lids onto the body of the box, and in this regard, it will be noted in FIG. 2 that the box includes a pair of channels 46 defined therethrough for guiding and supporting the bolts (not shown). FIG. 2 still further illustrates the mounting legs 22 which may be employed to fasten the box 10 to a vehicle or other such substrate.

Referring now to FIG. 3, there is shown a cross sectional view of the box 10 of FIG. 2 taken along line 3—3, and further including the first lid 14 and second lid 16 affixed thereto. It would be noted from this cross sectional view that the interior of the box 10 is divided into a first compartment 36 and a second compartment 48 by the interior wall 38. The power feed studs 32 pass through the interior wall 38 so that a first end of each stud, for example end 32a, is in the first compartment 36 and a second end of the stud, for example 32b, is in the second compartment 48. In the illustrated embodiment, the box is further configured to include a series of upstanding walls interposed between each of the nuts 34 in the first 36 and second 48 compartments. These upstanding walls 50 further aid in preventing shorting between the various contact points defined by the studs 32.

The top lid 14 and the bottom lid 16 are joined together, and maintained in contact with the remainder of the box by a bolt 18 passing therethrough. As illustrated, the bolt 18 engages a threaded nut 52 proximate the second lid 16. As noted above, the second lid 16 may further be fastened to the remainder of the box by an arrangement of clips or the like.

The cross sectional view of FIG. 3 further illustrates the wiring harness feed port 26 and elastomeric seal 28 associated therewith, as well as the wire feed port 40b, and associated elastomeric seal 54. As illustrated, the wire feed port 40b is covered by an access door 30.

In use, a wiring harness, or portion thereof, is fed into the second compartment 48 through the harness feed port 26. Electrical connection is established to selected ones of the wires constituting the wire harness by connecting those wires to various of the feed studs 32, and retaining them thereupon by the nuts 34. In some instances, such connection may be made directly to the wires of the harness, whereas in other instances it will be more expeditious to employ short jumper wires to make the connection. The wiring harness may be carried back out of the box through a separate port or through the port through which it entered. In some instances, the box may be connected to a specific terminal end of a wiring harness which is configured for connection to an access box, in which instance the harness need not be rerouted out of the box. After connection is made to the appropriate power feed studs, the second lid is replaced onto the box, and the box eventually affixed to a portion of the motor vehicle. Typically, the box will be placed at a location where it is readily accessible by a customer, such as a location underneath the hood or within the passenger compartment of the vehicle. The box is affixed to the vehicle via the mounting legs 22, and it will be appreciated that once the box is so affixed, access to the second lid, and hence access to the portion of the wiring harness exposed within the second compartment, will be restricted. Since the power feed studs also project into the first compartment 36, a customer may readily establish electrical communication to the harness by opening the first lid 14 so as to expose the studs 32, and then establishing connection to an appropriate one of the studs. It is anticipated that the manufacturer of the vehicle will provide indicia detailing which portions of the harness are connected to which specific ones of the studs. Once the appropriate connection is made, the connected wires are fed out of the box via the wire feed ports 40a, 40b, and the first lid 14 replaced.

Figure 4:
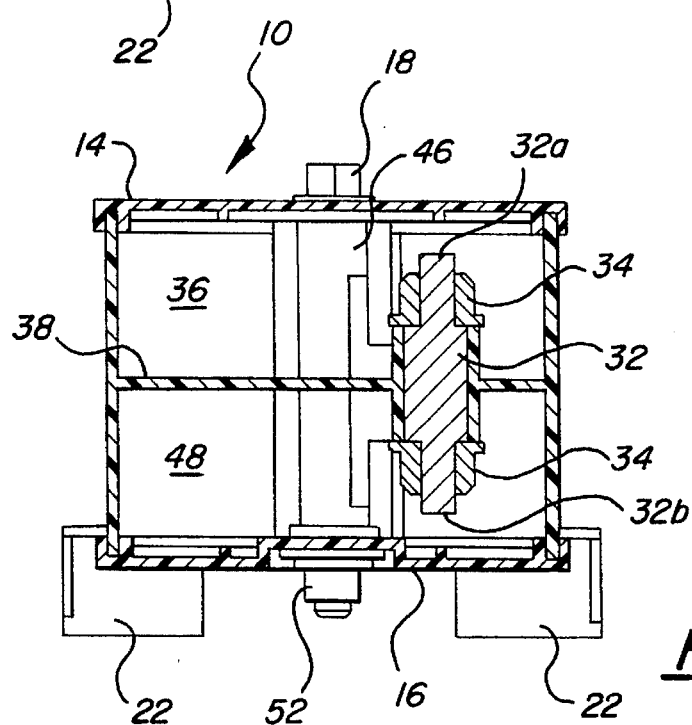
FIG. 4 is a cross sectional view of the box of FIG. 2 taken along line 4—4, and showing the first lid affixed thereto.

Referring now to FIG. 4, there is shown a cross sectional view of the box 10 of FIG. 2 taken along line 4—4, and including the first lid 14 and second lid 16 attached thereto. As illustrated, bolt 18 passes through the box 10 via a channel 46 and engages a nut 52 proximate the second lid 16. As is apparent in FIG. 4, the box 10 is divided into a first chamber 36 and a second chamber 48 by means of the interior wall 38. As further illustrated, a stud 32 passes through the interior wall 38 so as to have a first end thereof 32a in the first chamber 36 and a second end thereof 32b in the second chamber 48. In the illustrated embodiment, each end of the stud 32 has a nut 34 threaded thereonto. Also shown in FIG. 4 are two of the mounting legs 22, and it will be appreciated from this end view that when the legs 22 are fastened to a substrate, the second lid 16 is inaccessible.

In a preferred embodiment, the box of the present invention is primarily fabricated from a high strength engineering polymer such as nylon or the like. The elastomeric seals are preferably made from synthetic rubbers such as neoprene and neoprene blends as well as natural rubbers. The access shield may be made from the same high strength polymer as the remainder of the box or may be made from polypropylene or the like. The power feed studs are made from electrically conductive material such as brass, copper, steel or the like. In the illustrated embodiment, the power feed studs are shown as including a nut disposed at either end thereof for establishing electrical communication with the wiring harness or electrical component. In those instances where nuts are used to establish contact, it is generally preferable to include a lock washer therewith. It is to be understood that other means for establishing electrical communication may be similarly employed. For example, clips, screw terminals, push terminals and the like may be substituted for the nuts.

Other modifications and variations of the present invention may be practiced in accord with the teachings herein. For example, the box may be configured other than as is shown herein. The number of studs, and their placement, may be varied. The configuration and the attachment of the lids may also be varied within the scope of the present invention. In view of the foregoing, it is to be understood that the drawings, discussion and description presented herein are merely illustrative of particular embodiments of the invention and are not meant to be limitations upon the practice thereof. It is the following claims, including all equivalents, which define the scope of the invention.

We claim:

1. An access box for providing controlled electrical communication with a wiring harness, said box including:
   a first compartment defined therein;
   a first lid which is removably attachable to said box so as to enclose said first compartment;
   a second compartment defined therein;
   a second lid removably attachable to the box so as to enclose said second compartment;
   a wall separating said first and second compartments;
   a plurality of electrically conductive power feed studs passing through said wall, each power feed stud having a first end projecting into said first compartment and a second end projecting into said second compartment; and
   mounting means separate from said second lid for affixing the box to a substrate, said mounting means and said second lid being disposed and configured so that said second lid cannot be removed when the box is mounted to the substrate, and so that the interior of said second compartment is inaccessible when the box is mounted.

2. An access box as in claim 1, wherein at least one of said first and second lids includes a clip for retaining said lid in engagement with the remainder of said access box.

3. An access box as in claim 1, wherein at least one of said lids includes a bolt for retaining said lid in engagement with the remainder of said access box.

4. An access box as in claim 1, wherein the first end and the second end of each of said power feed studs includes screw threads formed thereupon for retainably engaging a threaded nut.

5. An access box as in claim 1, wherein said mounting means comprises a plurality of legs each of which has a mounting hole defined therethrough.

6. An access box as in claim 1, further including a wire feed port passing therethrough, and in communication with the first compartment, for permitting passage of a wire from the first compartment to a location exterior of the box.

7. An access box as in claim 6, further including an elastomeric seal associated with said wire feed port.

8. An access box as in claim 6, further including a door for covering said wire feed port when it is not in use.

9. An access box as in claim 1, further including a wiring harness feed port in communication with the second compartment, for permitting passage of a wiring harness from a location exterior of said access box into said second compartment.

10. An access box as in claim 9, further including an elastomeric seal associated with said wiring harness feed port.

11. An access box as in claim 9, further including a door for covering said wiring harness feed port when it is not in use.

12. A method for providing electrical access to a wiring harness of a motor vehicle, said method comprising the steps of:
   providing an access box comprising:
      a first compartment defined therein;
      a second compartment defined therein;
      a second lid removably attachable to said access box, for enclosing said second compartment;
      a wall separating said first and second compartments;
      a plurality of electrically conductive power feed studs passing through said wall, each power feed stud having a first end disposed in said first compartment, and a second end disposed in said second compartment; and
      mounting means, separate from said second lid, for affixing the access box to a motor vehicle, said mounting means and said second lid being disposed and configured so that the second lid cannot be removed when the access box is affixed to the motor vehicle;
   disposing a portion of a wiring harness in said second compartment, said wiring harness comprising a plurality of electrically conductive wires; and
   electrically connecting selected members of said plurality of electrically conductive wires to the second ends of selected ones of said power feed studs; whereby electrical access to said selected members of said plurality of electrically conductive wires may be had, in said first compartment, through the first ends of corresponding ones of said power feed studs;
   attaching said second lid to said access box so as to enclose said portion of said wiring harness therein; and
   affixing said access box to said vehicle via said mounting means after the step of electrically connecting said selected members of said plurality of electrically conductive wires to said power feed studs; whereby the interior of the second compartment is inaccessible when the access box is affixed to the vehicle.

13. A method as in claim 12, wherein the step of providing an access box further comprises an access box having a first lid which is removably attachable to said box for enclosing said first compartment.

14. A method as in claim 13, further including the steps of removing said first lid from said access box so as to expose the first ends of said power feed studs in said first compartment;
   electrically connecting an electrical conductor to the first end of one of said power feed studs; and
   reattaching said first lid to said box so as to enclose said first compartment.

* * * * *